M. C. Duffey,
Pipe Joint.
No. 99,172. Patented Jan. 25, 1870.
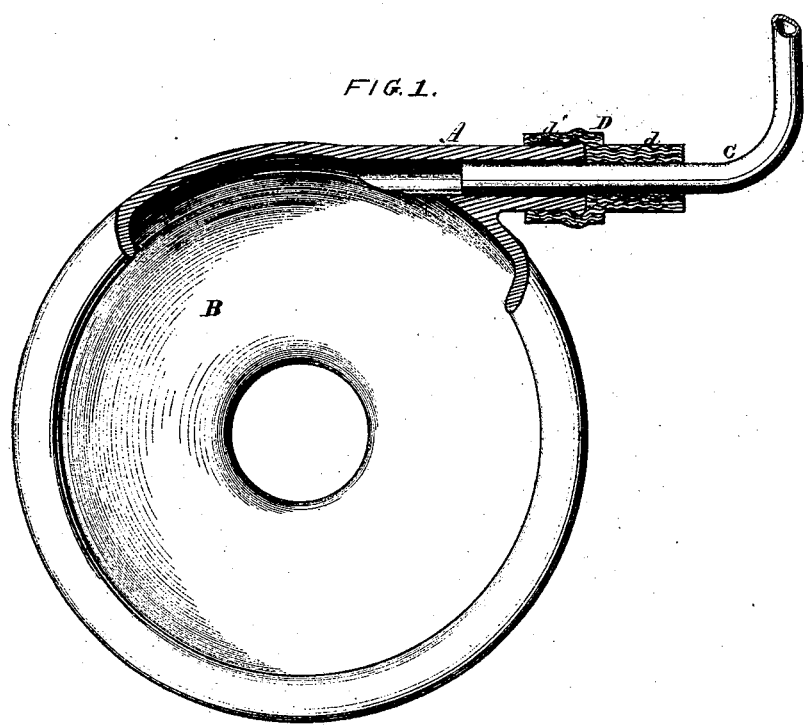
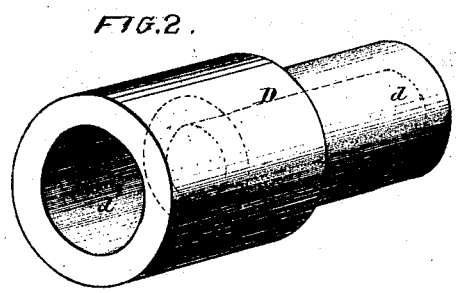

United States Patent Office.

MICHAEL C. DUFFEY, OF WASHINGTON, DISTRICT OF COLUMBIA.

Letters Patent No. 99,172, dated January 25, 1870.

IMPROVEMENT IN FLEXIBLE JOINTS FOR WATER-PIPES.

The Schedule referred to in these Letters Patent and making part of the same.

I, MICHAEL C. DUFFEY, of the city and county of Washington, in the District of Columbia, have invented a new and improved Joint for Connecting the Supply or other Pipes to the Arms of Water-Closet or other Receivers or Basins, of which invention the following is a description.

Nature and Objects of the Invention.

The object of my invention is to provide, as a substitute for the putty joint usually employed to cover and close the connection between the supply-pipe and the basin-arm in water-closets, urinals, and other water-apparatus, a more durable and secure joint, and one which may be readily and quickly applied.

To this end I construct a tubular "joint" of India rubber, or analogous elastic material, which may be cast in one piece, and preferably in the form of two hollow cylinders, of unequal diameter, placed end to end, the smaller part being adapted to fit tightly over the supply-pipe, and the larger part to clasp the basin-arm, within which the pipe is introduced in the usual manner.

Description of the Drawing.

In the accompanying drawing—

Figure 1 is a plan or top view of a water-closet basin, with the supply-pipe and joint in position, the joint and the basin-arm, and adjacent parts of the basin, being shown in section.

Figure 2 is a full-sized perspective view of the "joint" detached.

Similar letters of reference indicate corresponding parts in both views.

A represents the arm of the basin B, which may be constructed in any customary or suitable way.

C is the supply-pipe, introduced through the arm A, as is usual.

At D, in fig. 1, is shown a longitudinal section of my gum-elastic joint or connection, and the same is shown in full size, in perspective, in fig. 2. It is cast in one piece of India rubber, or analogous material, with cylindrical openings or chambers, of unequal diameter, passing longitudinally through, and connected in the centre.

The smaller end $d$ is thus adapted to fit tightly around the supply-pipe C, while the chamber $d'$, in the larger end, clasps the arm A, as clearly shown in fig. 1.

Operation.

Before introducing the supply-pipe into the basin-arm, the elastic joint or connection is drawn over the pipe to a sufficient distance. The end of the pipe is then inserted in the arm, and the larger part of the rubber "joint" drawn over the same.

A rib or enlargement may, if preferred, be formed on the end of the arm, to hold the rubber joint more securely; but, without this, a secure and durable water-tight connection is formed between the pipe and arm.

This connection is much more readily applied than the usual "putty joint," and has not the clumsy and unsightly appearance of the latter.

Its elasticity permits any slight motion of the pipe, in relation to the basin, without danger of impairing the joint, and the well-known property, in India rubber, of cohering to metal, causes it to become still more permanently and securely fixed in position in the course of time.

A further advantage of my rubber joint is seen in the fact that it is not subject to injury by rats, the depredations of which constitute a frequent and annoying cause of destruction of the joint in common use for this purpose.

I do not claim, broadly, a tube of different diameters at its respective ends, as I am aware that such tubes have before been made of rigid material, for different purposes; but

I claim, as my invention—

The joint or connection D $d$ $d'$, constructed of elastic material, and adapted for use in the manner and for the purposes herein set forth.

Witnesses:  M. C. DUFFEY.
OCTAVIUS KNIGHT,
F. M. KLAUCKE, Jr.